United States Patent [19]

Freitag et al.

[11] 4,281,884

[45] Aug. 4, 1981

[54] ELECTRICALLY CONDUCTIVE PNEUMATIC SPRING

[75] Inventors: Herbert Freitag, Koblenz-Metternich; Klaus Schnitzius, Rheinbrohl; Martin Müller; Willi Schäfer, both of Kesselheim, all of Fed. Rep. of Germany

[73] Assignee: Stabilus GmbH, Koblenz-Neuendorf, Fed. Rep. of Germany

[21] Appl. No.: 50,690

[22] Filed: Jun. 21, 1979

Related U.S. Application Data

[63] Continuation of Ser. No. 782,012, Mar. 28, 1977, abandoned.

[30] Foreign Application Priority Data

Apr. 7, 1976 [DE] Fed. Rep. of Germany ....... 2614927

[51] Int. Cl.³ .................... H01R 41/00; H01H 3/00; T16F 9/02; B60Q 18/0 4
[52] U.S. Cl. .................................. 339/9 R; 200/61.62
[58] Field of Search .................... 200/61.62, 61.53; 339/9 R, 10; 267/65 R

[56] References Cited

U.S. PATENT DOCUMENTS

| | | | |
|---|---|---|---|
| 2,247,843 | 7/1941 | Kamenarovic | 246/168 |
| 2,881,403 | 4/1959 | Vltavsky | 339/9 E |
| 3,812,312 | 5/1974 | Andersen et al. | 200/61.53 |
| 3,844,247 | 10/1974 | Collis et al. | 338/150 |
| 3,919,509 | 11/1975 | Schnitzius | 200/61.62 |
| 4,030,716 | 6/1977 | Freitag | 267/64 R |
| 4,089,512 | 5/1978 | Allinquant | 267/65 R |

FOREIGN PATENT DOCUMENTS

| | | |
|---|---|---|
| 1259212 | 1/1968 | Fed. Rep. of Germany . |
| 7142664 | 5/1972 | Fed. Rep. of Germany . |
| 7304750 | 8/1973 | Fed. Rep. of Germany . |
| 2421007 | 11/1975 | Fed. Rep. of Germany . |
| 7610754 | 10/1976 | Fed. Rep. of Germany . |
| 2622879 | 11/1976 | Fed. Rep. of Germany . |
| 7603281 | 3/1977 | Fed. Rep. of Germany . |
| 933977 | 5/1948 | France ................. 339/9 R |
| 539498 | 9/1941 | United Kingdom . |
| 626867 | 7/1949 | United Kingdom . |
| 996878 | 6/1965 | United Kingdom . |
| 1046176 | 10/1966 | United Kingdom . |
| 1282568 | 7/1972 | United Kingdom . |

Primary Examiner—James R. Scott
Attorney, Agent, or Firm—Brumbaugh, Graves, Donohue & Raymond

[57] ABSTRACT

In the illustrative embodiment of a current-carrying pneumatic spring disclosed, flow of electric current between external terminals on the cylinder member and piston rod member of the spring is provided by a contact element fixed on one of the members and carrying one or more contact faces which are resiliently biased into sliding engagement with an axially elongated face portion of the other member. Flow of electric current between the external terminals may thereby be provided over a range of positions or over all positions of axial movement of the piston rod member inward and outward of the cylinder cavity.

34 Claims, 5 Drawing Figures

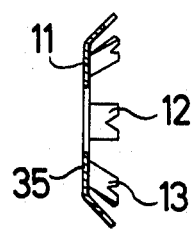
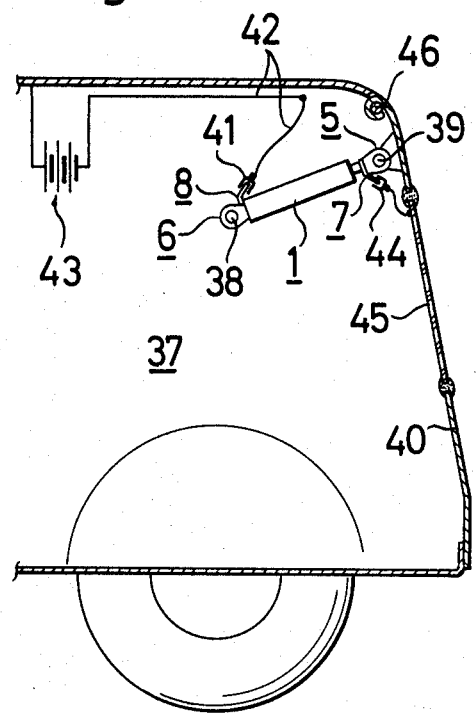
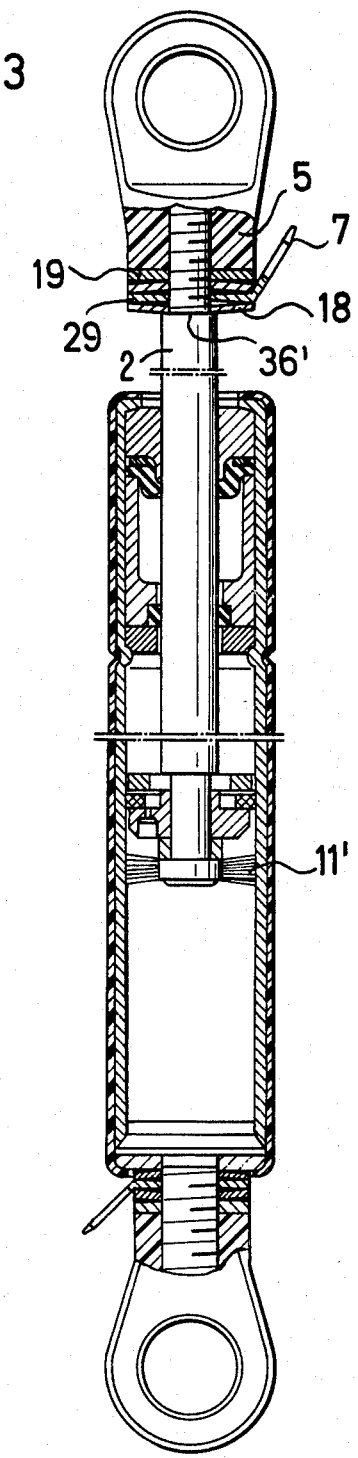

ELECTRICALLY CONDUCTIVE PNEUMATIC SPRING

This is a continuation of application Ser. No. 782,012 filed Mar. 28, 1977, now abandoned.

BACKGROUND OF THE INVENTION

1. Field of the Invention

This invention relates to pneumatic springs which connect mechanical parts movably mounted with respect to each other so as to compensate for the weight of one of said mechanical parts. The pneumatic spring fulfills besides its function as a balancing means also the function of transmitting electrical current between said mechanical parts.

2. The Prior Art

In U.S. Pat. No. 3,919,509, an electrically conductive pneumatic spring has been proposed which is capable of transmitting heavy currents only in one terminal position of the piston rod member with respect to the cylinder member, whereas in the other relative positions of said members only weak currents can be transmitted.

The invention will be described herein below with reference to an application in the field of automotive engineering to which it lends itself advantageously, but other applications will readily come to mind.

SUMMARY OF THE INVENTION

The pneumatic spring according to this invention has a cylinder member closed at its one end and provided with a guiding and sealing unit at its other end, a piston rod member introduced into said cylinder member through said guiding and sealing unit and having an outer end outside said cylinder member, a first fastening element provided adjacent the closed end of said cylinder member, a second fastening element provided adjacent the outer end of said piston rod member, a first electrical connector provided adjacent said closed end of said cylinder member and electrically connected to said cylinder member, a second electrical connector provided adjacent said outer end of said piston rod member and electrically connected to said piston rod member, an electrical connection between said first and said second electrical connector, and a pressurized gas contained within said cylinder member.

The structure defined so far is known from U.S. Pat. No. 3,919,509.

According to the invention, an improvement in such known electrically conductive pneumatic springs comprises a slide contact element fixed to one of said members and biased into electrically conductive sliding contact with the other member.

This improvement makes it possible to transmit heavier electric currents also in other relative positions of said piston rod member with respect to said cylinder member besides said above-mentioned terminal position.

BRIEF DESCRIPTION OF THE DRAWINGS

Other features and many of the attending advantages of this invention will readily be appreciated as the same becomes better understood by reference to the following detailed description of preferred embodiments when considered in connection with the appended drawing in which:

FIG. 2 illustrates an element of the embodiment of FIG. 1;

FIG. 3 shows a modified spring in elevational section;

FIG. 5 shows a station wagon equipped with a spring illustrated in FIGS. 1, 3 or 4 in fragmentary elevational section.

DETAILED DESCRIPTION OF EXEMPLARY EMBODIMENTS

Figure 1:
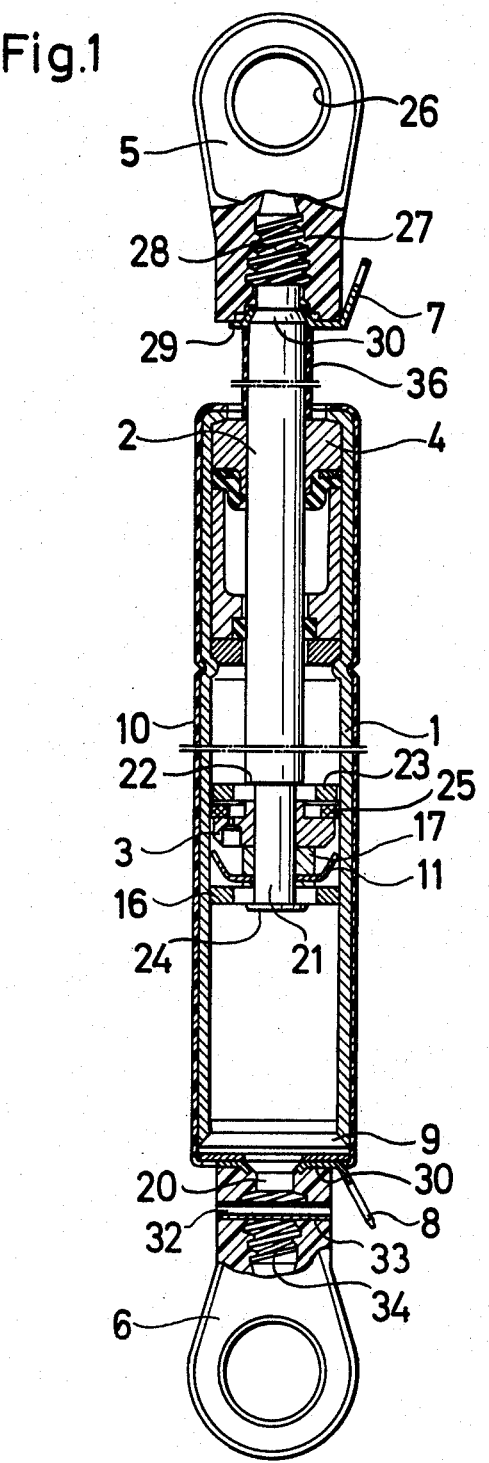
FIG. 1 shows a current-carrying pneumatic spring of the invention in elevational section.

Referring initially to FIG. 1, a cylinder member 1. This cylinder member 1 is provided at its one end with a thread bolt 20. At this end the cylinder member 1 is closed. On the other end of the cylinder member 1 is provided a guiding and sealing unit, as is known from FIG. 2 of U.S. Pat. No. 3,919,509. A piston rod member 2 is introduced into the cylinder member 1 through said guiding and sealing unit 4. The piston rod member 2 is provided with a section 21 of reduced diameter at its inner end which defines a radial shoulder 22 on the piston rod member 2. On the reduced section 21 there are provided an outer support disk 23, an apertured piston 3, an annular spacer member 17, a slide contact element 11 and an outer support disk 16 which protects the element 11 against excessive deflection. These parts are fixed on said reduced section 21 by a rivet 24 attached to the outer end of said reduced section 21. The parts 23, 3, 17, 11 and 16 provide a continuous passage for pressureized gas contained within said cylinder member 1 on both sides of the piston 3. A movable piston ring 25 is mounted between the piston 3 and the outer support disk 23, which movable piston ring 25 provides different flow resistance for the gas flowing from the upper side of the piston to the lower side as compared with the resistance to gas flow from the lower side to the upper side. This construction is known and described in more detail in U.S. Pat. No. 3,207,498. On the outer end of the piston rod member 2 a fastening element 5 is fixed. This fastening element 5 consists of insulating plastic material and is provided with a spherically concave, annular face 26 for constituting a universal joint with respect to a mechanical part having a complementary ball head. The fastening element 5 is provided with an inner thread 27 which is screwed on an outer thread 28 provided at the outer end of the piston rod member 2. A flat electrical connector 7 which is provided with an eyelet 29 is fixed on a frustoconical face 30 of the rod member by the fastening element. Electrical connection exists between the electrical connector 7 and the piston rod member 2 and may be enhanced by soldering.

At the lower end of the cylinder member 1 a further flat electrical connector 8 having an eyelet is fixed to the cylinder member by a fastening element 6. The electrical connector is electrically connected to the bottom 9 of the cylinder member 1. The fastening element 6 has basically the same structure as the fastening element 5. For securing the fastening element 6 in its position a slit, hollow pin 32 is introduced into a bore 33 of the fastening element 6 and is in engagement with the outer thread 34 of the thread bolt 20. Alternatively the pin 32 may also transverse a diametrical bore of the thread bolt 20. The fastening element 6 may also be secured to the thread bolt 20 by adhesive bonding.

The slide contact element 11 is illustrated in more detail in FIG. 2. It comprises an annular body 35 and radially outwardly directed tongues 12. The tongues 12 are slit at their radially outer ends so as to define claws 13. These claws 13 have contact faces of relatively soft copper, copper alloy, silver, or silver alloy which are in sliding contact with the radially inner harder steel face of the cylinder member 1. The annular body 35 is in electrical contact with the piston rod member 2. The tongues 12 are radially biased in such a way as to contact the inner face of the cylinder member 1 under pressure. This pressure is sufficient to break a lubricant film which is provided on the inner side of the cylinder member 1. The claws 13 contact the inner face of the cylinder member 1 over such a total contact area that the required current can be transmitted from the electrical connector 7 to the electrical connector 8. This contact area remains constant during the whole stroke of the piston rod member 2 with respect to the cylinder member 1. The contact area may be increased by reducing the angle of inclination of the tongues 12 relative to the inner cylinder wall.

The cylinder member 1 is provided on its radially outer side with an insulating coat 10; for example, a shrunk plastic tube. The piston rod member 2 is provided on its section which is outside the cylinder member 1 with an insulating shield 36 which may be a bellows of insulating material.

FIG. 5 shows a station wagon 37. The cylinder member 1 is connected by its fastening element 6 to a ball head 38 on the fixed body portion of the station wagon, whereas the piston rod member is connected by its fastening element 5 to a ball head 39 attached to the rear gate 40. The electrical connector 8 is connected by a clip 41 and a cable 42 to a battery 43, whereas the electrical connector 7 is connected by a clip 44 to the heating wires provided in the window 45 of the rear gate 40. The other end of the battery 43 is connected to the heating wires of the window 45 by the electrically conductive parts of the carriage body and the gate 40. The gate 40 is connected to the carriage body by a pivotal connection 46.

In the embodiment of FIG. 3, which is substantially identical with that of FIG. 1 as far as not described otherwise, there is provided a wire brush 11', instead of the slide contact element 11 for breaking the lubricant film on the inner cylinder wall. The eyelet 29 of the electrical connector 7 is interposed between two cup springs 18 and 19, said cup springs being interposed between a shoulder 36' of the piston rod member 2 and the fastening element 5.

Figure 4:
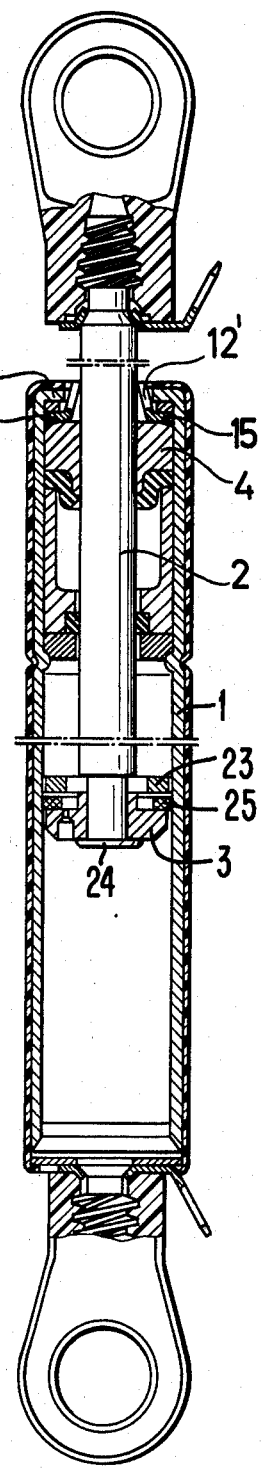
FIG. 4 shows a further modified pneumatic spring of the invention in elevational section.

In FIG. 4, there is shown yet another pneumatic spring substantially identical with that of FIG. 1 as far as not explicitly stated otherwise. A slide contact element 15 is interposed with its annular body 35 between the axially outer end of the guiding and sealing unit 4 and the annular upper end wall 47 of the cylinder member 1. The annular body 35 is provided with radially inwardly directed tongues 12 which contact the radially outer face of the piston rod member with sufficient pressure to break the lubricant film on the member 2.

Automotive applications of the electrically conductive pneumatic springs of the invention other than in the rear gate of a station wagon are found in motor hoods and trunk lids which carry external or internal lights, and applications outside the automotive field will suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a pneumatic spring-type electrical connector including a cylinder member having an axis and bounding a sealed cavity therein, a piston rod member secured to said cylinder member for axial movement inward and outward of said cavity, respective fastening elements on said members outside said cavity, respective terminals on said members outside said cavity, said cylinder member having an axially elongated face portion of electrically conductive material in said cavity, said face portion carrying a film of non-conductive lubricant, a compressed gas in said cavity biasing said piston rod member outward of said cavity, and current carrier means permitting flow of electric current between said terminals, the improvement in said current carrier means which comprises:
    (a) a conductive contact element fixed on said piston rod member and having at least one contact face;
    (b) resilient means biasing said at least one contact face into sliding engagement with said axially elongated face portion during said movement of the piston rod member with a force sufficient for breaking said lubricant film; and
    (c) conductive means connecting said face portion and said contact face to said terminals respectively.

2. In a connector as set forth in claim 1, said members consisting essentially of electrically conductive material and constituting said conductive means.

3. In a connector as set forth in claim 1, said contact element having a plurality of said contact faces, the contact faces being angularly spaced from each other relative to said axis and biased radially against respective parts of said face portion by said resilient means.

4. In a connector as set forth in claim 3, wherein said members are composed of electrically conductive material and comprise said conductive means, and said axially extending face portion comprises the inner circumferential wall of said cylinder bounding said sealed cavity.

5. In a connector as set forth in claim 3, said contact element having respective parts elongated toward said face portion and carrying said contact faces at the longitudinal ends thereof.

6. In a connector as set forth in claim 3, said contact faces consisting of a material softer than the material of said face portion.

7. In a connector as set forth in claim 6, said softer material being copper, a copper alloy, silver, or a silver alloy.

8. In a connector as set forth in claim 7, the material of said face portion being steel.

9. In a connector as set forth in claim 1 said contact element having an annular portion surrounding said axis, and a plurality of angularly spaced, radially elongated portions carrying respective contact faces biased against said axially elongated face portion.

10. In a connector as set forth in claim 1, said contact element having a flat annular first portion extending about said axis, and a plurality of angularly offset, radially elongated second portions extending from said annular portion toward said face portion and carrying respective contact faces, said second portions consisting essentially of resilient material, said material constituting said resilient means.

11. A pneumatic spring-type electrical connector comprising:
(a) a cylinder member having an axis,
  (1) said cylinder member being closed at one axial end and including an annular, axially terminal end wall at the other end;
(b) an annular guiding and sealing unit in said cylinder member adjacent said end wall;
(c) a piston rod member slidably received in said unit for axial movement relative to said cylinder member, said unit and said one axial end bounding a sealed cavity in said cylinder, a portion of said piston rod member projecting axially beyond said end wall in all axial positions of said piston rod member;
(d) a body of compressed gas in said cavity biasing said piston rod member outward of said cavity;
(e) a lubricant contained at least in part in said sealing unit for lubricating said piston rod member;
(f) fastening means on said members for fastening said members to respective objects;
(g) a first terminal on said cylinder member outside said cavity adjacent said closed end;
(h) a second terminal on said portion of said piston rod member; and
(i) electrically conductive means for conductively connecting said first and second terminals, said conductive means including
  (1) a conductive contact element mounted on one of said members and having at least one contact face,
  (2) an axially elongated conductive face portion on said other member located at least in part axially intermediate to said end wall and said one axial end, and
  (3) resilient means biasing said at least one contact face into sliding engagement with said conductive axially-elongated face portion of the other member during movement of said piston rod member relative to said cylinder member with sufficient force to establish an electrical connection with said face portion notwithstanding the presence on said face portion of a lubricant film.

12. A connector as set forth in claim 11, wherein said at least one contact face and said face portion consist of electrically conductive material, the material of said contact face being softer than the material of said face portion.

13. A connector as set forth in claim 12, wherein said softer material is copper, a copper alloy, silver, or a silver alloy, and the material of said face portion is steel.

14. A connector as set forth in claim 11, wherein said contact element has an annular portion and a plurality of tongue portions radially extending from said annular portion toward said other member in angularly spaced relationship, each of said tongue portions carrying a contact face, said contact faces being biased into sliding engagement with respective angularly-spaced, axially-elongated face portions of the other member.

15. A connector as set forth in claim 14, wherein said members are composed of electrically conductive material, said one member is said piston rod member, and said conductive axially elongated face portion of said other member is the circumferential inner wall of said cylinder member.

16. A connector as set forth in claim 14, wherein said annular portion is substantially flat, and said tongue portions are obliquely inclined relative to said flat portion.

17. A connector as set forth in claim 11, wherein said contact element consists essentially of resilient material, said material constituting said resilient means.

18. A connector as set forth in claim 11, wherein said contact element comprises a wire brush including a plurality of wires, each wire carrying a contact face.

19. A connector as set forth in claim 11, wherein said one member is said piston rod member.

20. A connector as set forth in claim 19, further comprising a piston mounted on said piston rod member in said cavity and axially dividing the cavity into two compartments respectively adjacent and remote from said unit, said contact element being mounted on said piston rod member in said remote compartment.

21. A connector as set forth in claim 19, further comprising a support disk mounted on said piston rod in said remote compartment, said contact element being resiliently deformable and being axially interposed between said piston and said support disk in a position in which the piston and disk limit resilient deformation of said contact element.

22. A connector as set forth in claim 1, wherein said contact element is mounted on said cylinder member.

23. A connector as set forth in claim 22, wherein said contact element is mounted axially intermediate said end wall and said unit.

24. A connector as set forth in claim 11, wherein said members consist essentially of conductive material, and said fastening means include insulating means for electrically insulating said members from said objects.

25. A connector as set forth in claim 24, wherein said fastening means include two fastening elements respectively axially secured on said cylinder member outside said cavity adjacent said closed end, and axially secured on said portion of said piston rod member, respective portions of said first and second terminals being axially interposed between said fastening elements and, respectively, said members.

26. A connector as set forth in claim 25, wherein said fastening elements and said members carry respective, matingly engaged threads about said axis, said terminals having respective annular portions about said axis.

27. A connector as set forth in claim 11, further comprising means for electrically insulating said members and said objects from one another.

28. A connector as set forth in claim 11, further comprising means for electrically insulating said first and second terminals and said electrically conductive means from said respective objects.

29. A pneumatic spring-type electrical connector comprising:
(a) a cylinder member having an axis,
  (1) said cylinder member being closed at one axial end and including an annular, axially terminal end wall at the other end;
(b) an annular guiding and sealing unit in said cylinder member adjacent said end wall;
(c) a piston rod member slidably received in said unit for axial movement relative to said cylinder member, said unit and said one axial end bounding a sealed cavity in said cylinder, a portion of said piston rod member projecting axially beyond said end wall in all axial positions of said piston rod member;
(d) a body of compressed gas in said cavity biasing said piston rod outward of said cavity;

(e) fastening means on said members for fastening said members to respective objects;

(f) a first terminal on said cylinder member outside said cavity adjacent said closed end;

(g) a second terminal on said portion of said piston rod member; and (h) electrically conductive means for conductively connecting said first and second terminals, said conductive means including:

(1) a conductive contact element mounted on said cylinder member, at least a portion of said contact element being provided axially between an axially outer face of said end wall and said unit, said conductive contact element having at least one contact face; and (2) resilient means biasing said contact face into sliding engagement with a corresponding electrically conductive, axially elongated face portion of said piston rod member during movement of said piston rod relative to said cylinder member.

30. A connector as set forth in claim 29, further comprising means for electrically insulating said members and said objects from one another.

31. A connector as set forth in claim 29, further comprising means for electrically insulating said first and second terminals and said electrically conductive means from said respective objects.

32. A connector as set forth in claim 29, wherein said contact element has an annular portion about said axis and a plurality of tongue portions radially extending from said annular portion toward said piston rod member in angularly spaced relationship and carrying respective contact faces, and said resilient means biases said contact faces into sliding engagement with respective conductive axially-elongated face portions of said piston rod member during movement of said piston rod relative to said cylinder member.

33. A connector as set forth in claim 32, wherein said tongue portions consist essentially of resilient material, said resilient material constituting said resilient means.

34. A connector as set forth in claim 32, wherein said contact element is mounted on said cylinder member axially intermediate said end wall and said unit.

* * * * *

UNITED STATES PATENT AND TRADEMARK OFFICE
CERTIFICATE OF CORRECTION

PATENT NO. : 4,281,884
DATED : August 4, 1981
INVENTOR(S) : Herbert Freitag et al.

It is certified that error appears in the above—identified patent and that said Letters Patent is hereby corrected as shown below:

Col. 2, lines 12 and 13, delete "1. This cylinder member";

Col. 2, line 68, "tongues 12" should read --, resilient tongues 12 obliquely inclined to the planar face of the body 35--;

Col. 3, line 56, "12" should read --12'--;

Col. 6, line 17, "claim 19" should read --claim 20--; and

Col. 6, line 24, "claim 1" should read --claim 11--.

Signed and Sealed this

Twenty-seventh Day of October 1981

[SEAL]

Attest:

GERALD J. MOSSINGHOFF

*Attesting Officer*     *Commissioner of Patents and Trademarks*